US 011165109B2

(12) United States Patent
Ohkuma (10) Patent No.: US 11,165,109 B2
(45) Date of Patent: Nov. 2, 2021

(54) COOLING STRUCTURE FOR BATTERY PACK

(71) Applicant: HONDA MOTOR CO., LTD., Tokyo (JP)

(72) Inventor: Kanae Ohkuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 180 days.

(21) Appl. No.: 16/553,184

(22) Filed: Aug. 28, 2019

(65) Prior Publication Data

US 2020/0076026 A1    Mar. 5, 2020

(30) Foreign Application Priority Data

Aug. 31, 2018    (JP) .............................. JP2018-163120

(51) Int. Cl.
| | | |
|---|---|---|
| *H01M 10/6556* | (2014.01) | |
| *H01M 10/613* | (2014.01) | |
| *H01M 10/625* | (2014.01) | |
| *H01M 10/6567* | (2014.01) | |
| *H01M 50/20* | (2021.01) | |

(Continued)

(52) U.S. Cl.
CPC ..... *H01M 10/6556* (2015.04); *H01M 10/613* (2015.04); *H01M 10/625* (2015.04); *H01M 10/6567* (2015.04); *H01M 50/20* (2021.01); *B60K 1/04* (2013.01); *B60K 6/28* (2013.01); *B60K 2001/005* (2013.01); *B60K 2001/0433* (2013.01); *B60Y 2200/92* (2013.01);

(Continued)

(58) Field of Classification Search
None
See application file for complete search history.

(56) References Cited

U.S. PATENT DOCUMENTS

| | | |
|---|---|---|
| 9,925,890 B2 | 3/2018 | Enning et al. |
| 10,020,470 B2 | 7/2018 | Ito et al. |

(Continued)

FOREIGN PATENT DOCUMENTS

| | | |
|---|---|---|
| DE | 10 2014 010 491 | 1/2016 |
| DE | 10 2018 111 269 | 11/2018 |

(Continued)

OTHER PUBLICATIONS

German Search Report for corresponding DE Application No. 10 2019 211 901.8, dated Jun. 9, 2020.

(Continued)

*Primary Examiner* — Alix E Eggerding
(74) *Attorney, Agent, or Firm* — Mori & Ward, LLP (57) ABSTRACT

In a cooling structure for a battery pack, a case bottom wall of a first battery case is divided into left and right case bottom walls. A first cooling medium jacket includes left and right first cooling medium jackets formed respectively in the left and right case bottom walls. Left ends of the left first cooling medium jacket and second cooling medium jacket are made to communicate with each other via a left cooling medium passage. Right ends of the right first cooling medium jacket and second cooling medium jacket are made to communicate with each other via a right cooling medium passage. Accordingly, it is possible to simplify the structure of a cooling medium passage for supplying cooling medium to a cooling medium jacket of battery cases on two levels.

9 Claims, 8 Drawing Sheets

(51) Int. Cl.
*B60K 1/04* (2019.01)
*B60K 1/00* (2006.01)
*B60K 6/28* (2007.10)

(52) U.S. Cl.
CPC ..... *B60Y 2306/05* (2013.01); *B60Y 2400/112* (2013.01); *H01M 2220/20* (2013.01)

(56) References Cited

U.S. PATENT DOCUMENTS

| | | | |
|---|---|---|---|
| 10,220,694 | B2 | 3/2019 | Mizoguchi et al. |
| 10,403,945 | B2 | 9/2019 | Champagne et al. |
| 2010/0136420 | A1 | 6/2010 | Shin et al. |
| 2011/0293974 | A1* | 12/2011 | Yoon ............... H01M 10/625 429/72 |
| 2013/0241493 | A1 | 9/2013 | Kosaki et al. |
| 2013/0330587 | A1 | 12/2013 | Takahashi et al. |
| 2014/0338998 | A1 | 11/2014 | Fujii et al. |
| 2018/0229772 | A1* | 8/2018 | Erlacher ............ B60K 1/04 |
| 2018/0241102 | A1 | 8/2018 | Kim et al. |
| 2018/0248159 | A1* | 8/2018 | Kim ............... H01M 10/425 |
| 2020/0185795 | A1* | 6/2020 | Park ............... H01M 10/6552 |

FOREIGN PATENT DOCUMENTS

| | | |
|---|---|---|
| EP | 2637248 | 9/2013 |
| JP | 2010-504622 | 2/2010 |
| JP | 2011-06025 | 1/2011 |
| JP | 2011-006052 | 1/2011 |
| JP | 2012-022830 | 2/2012 |
| JP | 5847815 B2 | 2/2012 |
| JP | 2013-122821 | 6/2013 |
| JP | 2013-187159 | 9/2013 |
| WO | WO 2017/002325 | 1/2017 |

OTHER PUBLICATIONS

Japanese Office Action for corresponding JP Application No. 2018-163120, dated Jan. 8, 2020 (w/ English machine translation).

* cited by examiner

BOTTOM VIEW

COOLING STRUCTURE FOR BATTERY PACK

BACKGROUND OF THE INVENTION

Field of the Invention

The present invention relates to a cooling structure for a battery pack, wherein the battery pack is formed by superimposing a second battery case on an upper side of a first battery case, a first cooling medium jacket through which cooling medium flows being formed on a lower face of the first battery case and a second cooling medium jacket through which cooling medium flows being formed on a lower face of the second battery case.

Description of the Related Art

Japanese Patent No. 5847815 has made known a cooling device for a vehicle battery in which a plate-shaped coolant line (cooling medium jacket) having a plurality of coolant flow paths formed in its interior is abutted against the bottom of a battery, and this coolant line is fixed to the bottom of the battery by a clamp element with a heat insulating element held therebetween.

Also, Japanese Patent Application Laid-open No. 2011-6025 has made known a battery assembly cooling structure for a vehicle in which a lower face of a battery case housing a battery is cooled with the air flow of the vehicle, and an upper face and a rear face of the battery case, which it is difficult for the air flow to make contact with, are each provided with a water jacket.

A battery pack of a hybrid vehicle includes battery cases on two levels that are stacked in the up-down direction, and when a cooling medium jacket of the battery case at the first level is divided into two, that is, left and right, in order to avoid interference with an exhaust passage member, there is a possibility that a cooling medium passage for supplying cooling medium to a total of three cooling medium jackets will have a long and complicated structure.

SUMMARY OF THE INVENTION

The present invention has been accomplished in light of the above circumstances, and it is an object thereof to simplify the structure of a cooling medium passage for supplying cooling medium to a cooling medium jacket of battery cases on two levels.

In order to achieve the object, according to a first aspect of the present invention, there is provided a cooling structure for a battery pack, wherein the battery pack is formed by superimposing a second battery case on an upper side of a first battery case, a first cooling medium jacket through which cooling medium flows being formed on a lower face of the first battery case and a second cooling medium jacket through which cooling medium flows being formed on a lower face of the second battery case, wherein a case bottom wall of the first battery case is divided into a left case bottom wall and a right case bottom wall by a recess portion housing a longitudinal member extending in a fore-and-aft direction, the first cooling medium jacket comprises a left first cooling medium jacket formed between a lower face of the left case bottom wall and a left lid member joined thereto, and a right first cooling medium jacket formed between a lower face of the right case bottom wall and a right lid member joined thereto, the left end of the left first cooling medium jacket and the left end of the second cooling medium jacket are made to communicate with each other via a left cooling medium passage, and the right end of the right first cooling medium jacket and the right end of the second cooling medium jacket are made to communicate with each other via a right cooling medium passage.

In accordance with the first aspect, with regard to the battery pack formed by superimposing the second battery case on the upper side of the first battery case, the first cooling medium jacket, through which cooling medium flows, is formed on the lower face of the first battery case and the second cooling medium jacket, through which cooling medium flows, is formed on the lower face of the second battery case. Since the case bottom wall of the first battery case is divided into the left case bottom wall and the right case bottom wall by means of the recess portion housing the longitudinal member extending in the fore-and-aft direction, the first cooling medium jacket includes the left first cooling medium jacket formed between the lower face of the left case bottom wall and the left lid member joined thereto, and the right first cooling medium jacket formed between the lower face of the right case bottom wall and the right lid member joined thereto, the left end of the left first cooling medium jacket and the left end of the second cooling medium jacket are made to communicate with each other via the left cooling medium passage, and the right end of the right first cooling medium jacket and the right end of the second cooling medium jacket are made to communicate with each other via the right cooling medium passage, even if the cooling medium jacket has a two level structure and the cooling medium jacket at the first level is divided into left and right, it is possible to connect the cooling medium jackets by a continuous cooling medium passage, thus enabling high cooling performance to be obtained while minimizing the number of components and simplifying the structure.

According to a second aspect of the present invention, in addition to the first aspect, a cooling medium supply port formed in one of the left first cooling medium jacket and the right first cooling medium jacket and a cooling medium discharge port formed in an other of the left first cooling medium jacket and the right first cooling medium jacket are both provided on a front face side or a rear face side of the first battery case.

In accordance with the second aspect, since the cooling medium supply port formed in one of the left first cooling medium jacket and the right first cooling medium jacket and the cooling medium discharge port formed in the other of the left first cooling medium jacket and the right first cooling medium jacket are both provided on the front face side or the rear face side of the first battery case, even if the cooling medium tank is provided in front or to the rear of the battery pack, it is possible to minimize the length of the cooling medium passage connecting the cooling medium tank and the battery pack.

According to a third aspect of the present invention, in addition to the second aspect, the cooling medium supply port and the cooling medium discharge port are formed at an inner ends in a vehicle width direction of the left first cooling medium jacket and the right first cooling medium jacket.

In accordance with the third aspect, since the cooling medium supply port and the cooling medium discharge port are formed at the inner ends in the vehicle width direction of the left first cooling medium jacket and the right first cooling medium jacket, an inlet and an outlet for cooling medium are formed at opposite ends of the left first cooling medium jacket, and an inlet and an outlet for cooling medium are formed at opposite ends of the right first cooling medium jacket, thus improving the cooling performance of the left and right first cooling medium jackets.

According to a fourth aspect of the present invention, in addition to the first aspect, the second cooling medium jacket is formed between a case upper wall of the first battery case and a case lower wall of the second battery case.

In accordance with the fourth aspect, since the second cooling medium jacket is formed between the case upper wall of the first battery case and the case lower wall of the second battery case, it is possible to form the second cooling medium jacket while minimizing any increase in the number of components.

According to a fifth aspect of the present invention, in addition to the first aspect, one or a plurality of third battery cases are superimposed on an upper side of the second battery case, a third cooling medium jacket is formed on a lower face of the third battery case, and the third cooling medium jacket is connected in parallel with the second cooling medium jacket.

In accordance with the fifth aspect, since there are provided one or a plurality of third battery cases superimposed on the upper side of the second battery case, the third cooling medium jacket is formed on the lower face of the third battery case, and the third cooling medium jacket is connected in parallel with the second cooling medium jacket, even if battery cases on three or more levels are superimposed, it is possible to efficiently supply cooling medium to a cooling medium jacket of a battery case that is at the third or higher level without making the structure of the cooling medium passage complicated.

According to a sixth aspect of the present invention, in addition to the first aspect, a battery module housed in the second battery case is formed by layering battery cells in the vehicle width direction, and the second cooling medium jacket of the second battery case is disposed in the vehicle width direction.

In accordance with the sixth aspect, since the battery module housed in the second battery case is formed by layering battery cells in the vehicle width direction, and the second cooling medium jacket of the second battery case is disposed in the vehicle width direction, the cooling medium of the second cooling medium jacket flows along the longitudinal direction of the battery module, and it becomes possible to efficiently cool all of the battery cells of the battery module.

Note that a muffler 19 of embodiments corresponds to the longitudinal member of the present invention, a cooling water supply passage 33e of the embodiments corresponds to the left cooling medium passage of the present invention, a cooling water discharge passage 33g of the embodiments corresponds to the right cooling medium passage of the present invention, a left first water jacket 36A of the embodiments corresponds to the first cooling medium jacket or the left first cooling medium jacket of the present invention, a right first water jacket 36B of the embodiments corresponds to the first cooling medium jacket or the right first cooling medium jacket of the present invention, a cooling water supply port 36a of the embodiments corresponds to the cooling medium supply port of the present invention, a cooling water discharge port 36b of the embodiments corresponds to the cooling medium discharge port of the present invention, a second water jacket 47 of the embodiments corresponds to the second cooling medium jacket of the present invention, and a third water jacket 54 of the embodiments corresponds to the third cooling medium jacket of the present invention.

The above and other objects, characteristics and advantages of the present invention will be clear from detailed descriptions of the preferred embodiments which will be provided below while referring to the attached drawings.

DESCRIPTION OF THE PREFERRED EMBODIMENTS

First Embodiment

A first embodiment of the present invention is explained below by reference to FIG. 1 to FIG. 7. In the following description reference numbers corresponding to components of exemplary embodiments are included only for ease of understanding, but the applicant's claims are not limited to the exemplary embodiments or to specific components of the exemplary embodiments. In the present specification, the fore-and-aft direction, the left-and-right direction (vehicle width direction), and the up-and-down direction are defined with reference to an occupant seated on a driving seat.

Figure 1:
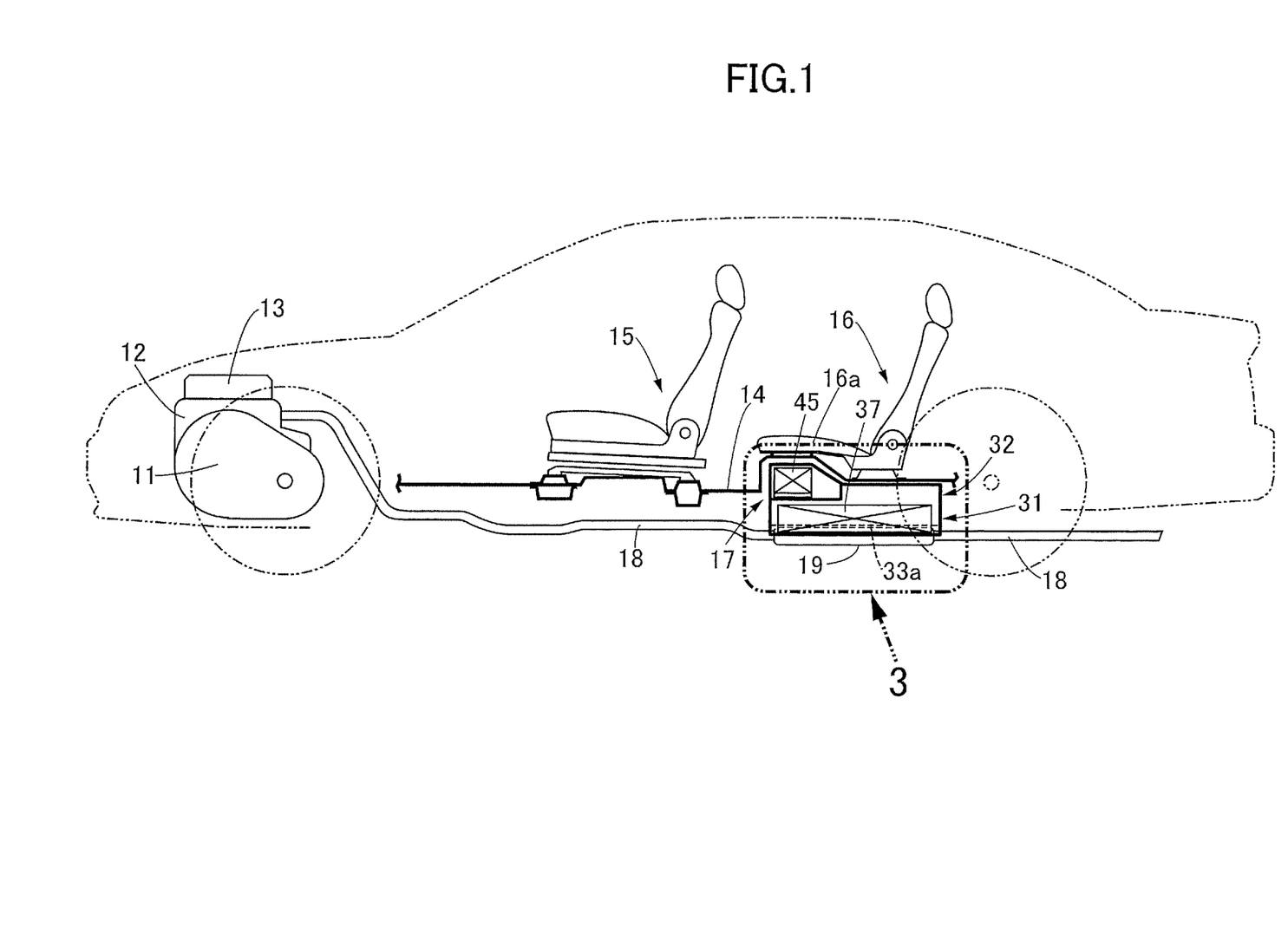
FIG. 1 is a side view of a vehicle body of a plug-in hybrid vehicle (first embodiment).

As shown in FIG. 1, mounted on a front part of a vehicle body of a front wheel drive plug-in hybrid vehicle are an electric motor 11 for driving a front wheel, an engine 12 for driving a generator for charging a battery, and a power drive unit 13 equipped with an inverter for controlling driving of the electric motor 11. A front seat 15 and a rear seat 16 are disposed on an upper face of a floor panel 14, and a battery pack 17 for supplying power to the electric motor 11 is mounted on a lower face of the floor panel 14 beneath the rear seat 16. An exhaust pipe 18 extends rearward from the engine 12, and a muffler 19 provided in an intermediate part of the exhaust pipe 18 is disposed beneath the battery pack 17.

Figure 2:
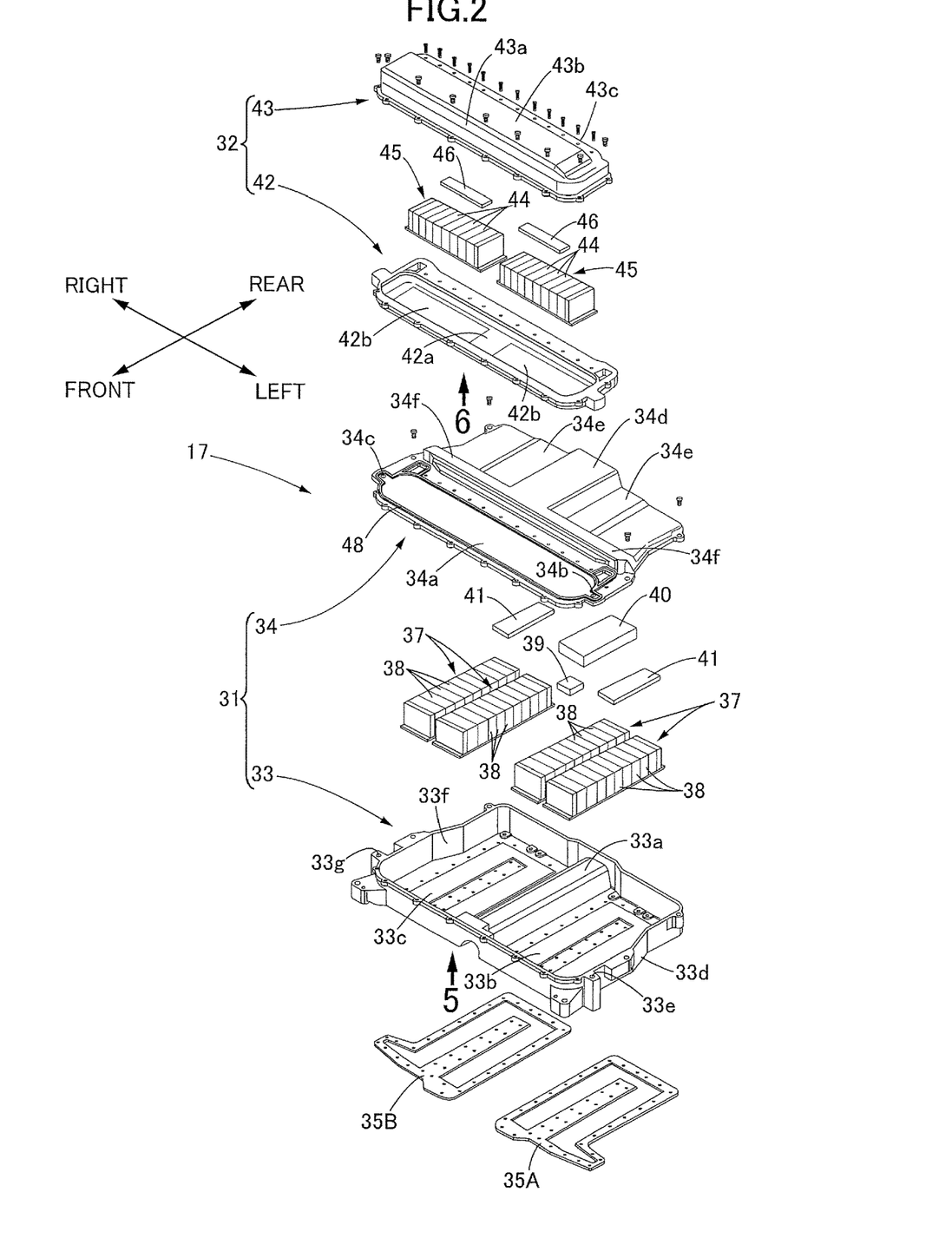
FIG. 2 is an exploded perspective view of a battery pack (first embodiment).

As shown in FIG. 2, the battery pack 17 includes a first battery case 31 on a lower level and a second battery case 32 on an upper level superimposed on an upper front part of the first battery case 31. The first battery case 31 includes a first case main body 33 and a first cover 34 both made by metal die-casting, and is formed by joining the first cover 34 to an opening in an upper face of the first case main body 33. A groove-shaped recess portion 33a having a semicircular section and extending in the fore-and-aft direction is formed in a middle part in the vehicle width direction of the first case main body 33 so as to be recessed upward, and a part of the muffler 19 (see FIG. 1) is housed in the recess portion 33a.

As shown in FIG. 3 to FIG. 5 and FIG. 7, the first case main body 33 includes a left case bottom wall 33b and a right case bottom wall 33c which are divided in the leftand-right direction by the recess portion 33a; joining a left lid member 35A to a lower face of the left case bottom wall 33b forms a left first water jacket 36A between the left case bottom wall 33b and the left lid member 35A, and joining a right lid member 35B to a lower face of the right case bottom wall 33c forms a right first water jacket 36B between the right case bottom wall 33c and the right lid member 35B.

A cooling water supply port 36a to which cooling water is supplied from a cooling water tank, which is not illustrated, is formed at the front end and inner end in the vehicle width direction (right end) of the left first water jacket 36A, and a cooling water supply passage 33e is formed in the left case side wall 33d of the first case main body 33 so as to face upward, the cooling water discharged from the left end of the left first water jacket 36A being supplied to the second battery case 32 via the cooling water supply passage 33e. A cooling water discharge port 36b via which cooling water is discharged into the cooling water tank, which is not illustrated, is formed at the front end and inner end in the vehicle width direction (left end) of the right first water jacket 36B, and a cooling water discharge passage 33g is formed so as to face downward in the right case side wall 33f of the first case main body 33, the cooling water discharged from the second battery case 32 being supplied to the right end of the right first water jacket 36B via the cooling water discharge passage 33g.

Returning to FIG. 2, two battery modules 37 are placed on each of upper faces of the left case bottom wall 33b and the right case bottom wall 33c of the first case main body 33. The rectangular parallelepiped battery module 37 is formed by layering a plurality of battery cells 38 in the longitudinal direction, and is disposed in the fore-and-aft direction so that its longitudinal direction (the direction in which they are layered) follows the left and right sides of the recess portion 33a of the first case main body 33.

A junction board 39 and a battery control device 40 are disposed on an upper face of a rear part of the recess portion 33a of the first case main body 33, and a cell voltage sensor 41 is disposed on an upper face of the battery module 37 of each of the left and right sides of the junction board 39 and the battery control device 40.

The first cover 34, which covers an opening in an upper face of the first case main body 33, is formed so that a case upper wall 34a forming a bottom wall of a second water jacket 47, which is described later, extends in the vehicle width direction, and left and right communication holes 34b and 34c are formed in opposite end parts in the vehicle width direction of the case upper wall 34a, the left and right communication holes 34b and 34c communicating respectively with the cooling water supply passage 33e and the cooling water discharge passage 33g on the left and right sides of the first case main body 33. A bulge portion 34d covering the upper side of the junction board 39 and the battery control device 40 is formed in a middle part in the vehicle width direction in a rear part of the first cover 34, and bulge portions 34e each covering the upper side of the left and right cell voltage sensors 41 are formed on opposite sides of the bulge portion 34d. A beam portion 34f having a trapezoidal section and projecting upward is formed in the vehicle width direction in a middle part in the fore-and-aft direction of the first cover 34.

The second battery case 32 includes a second case main body 42 and a second cover 43 both made by metal die-casting, two, that is, left and right, battery modules 45 formed by layering battery cells 44 in the vehicle width direction are disposed in the interior thereof, and a cell voltage sensor 46 is disposed on an upper face of each battery module 45. A case lower wall 42a of the second case main body 42 of the second battery case 32 is provided with a recess portion 42b recessed upward, and the second water jacket 47 is defined between a lower face of the recess portion 42b and an upper face of the case upper wall 34a of the first cover 34 of the first battery case 31 (see FIG. 3, FIG. 4, FIG. 6, and FIG. 7).

Figure 3:
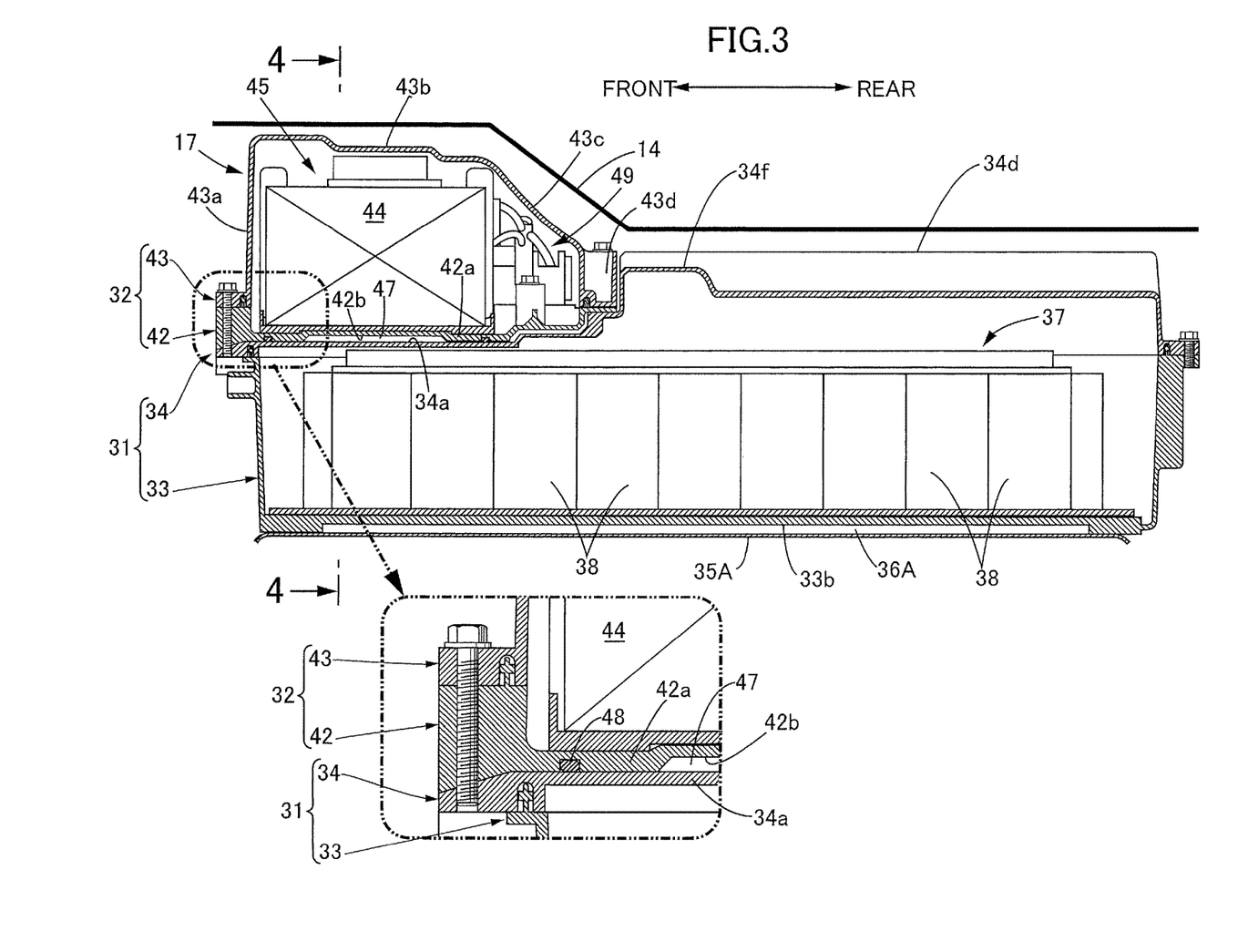
FIG. 3 is an enlarged view of part 3 in FIG. 1 (first embodiment).
Figure 4:
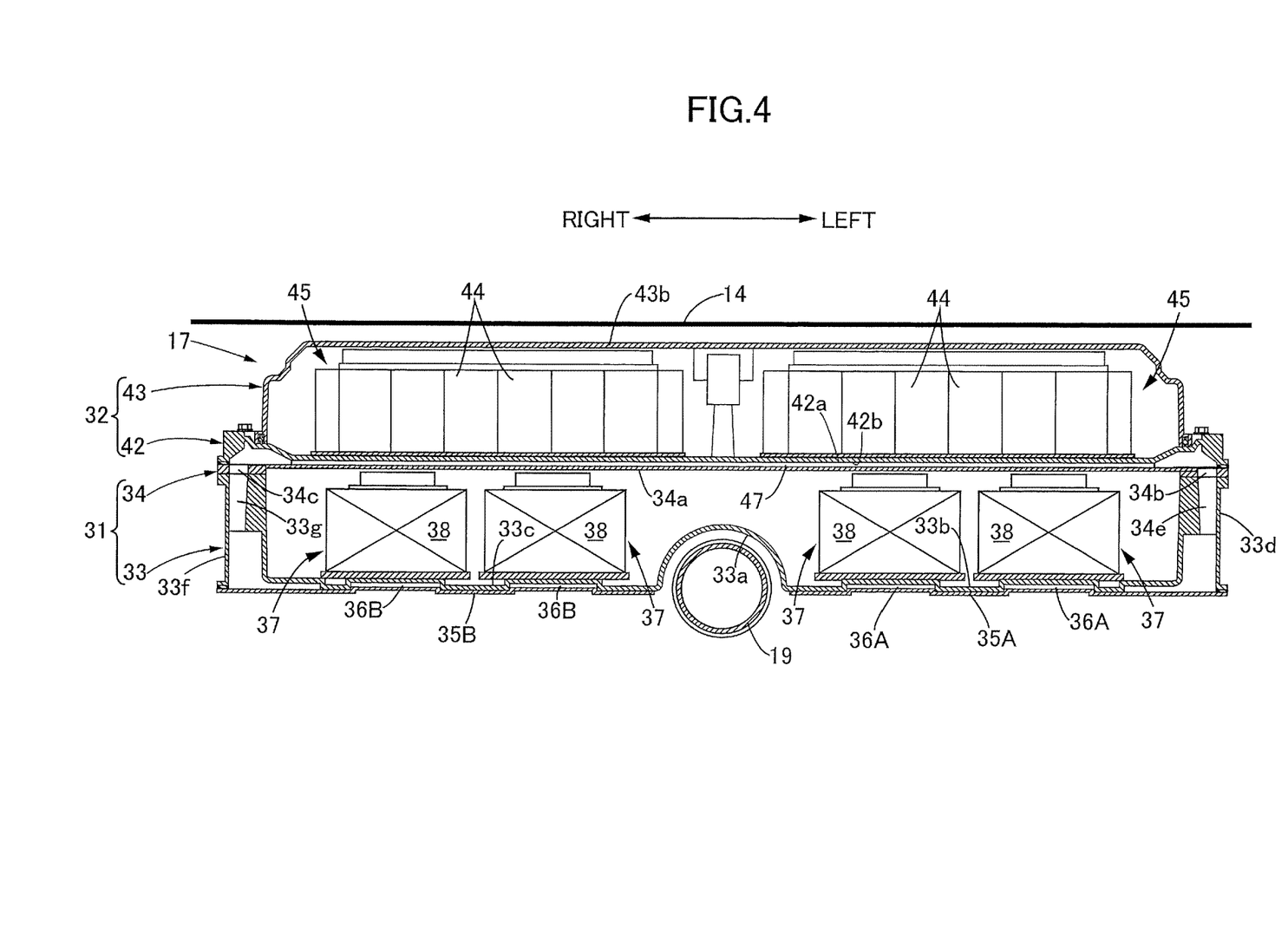
FIG. 4 is a sectional view along line 4-4 in FIG. 3 (first embodiment).
Figure 5:
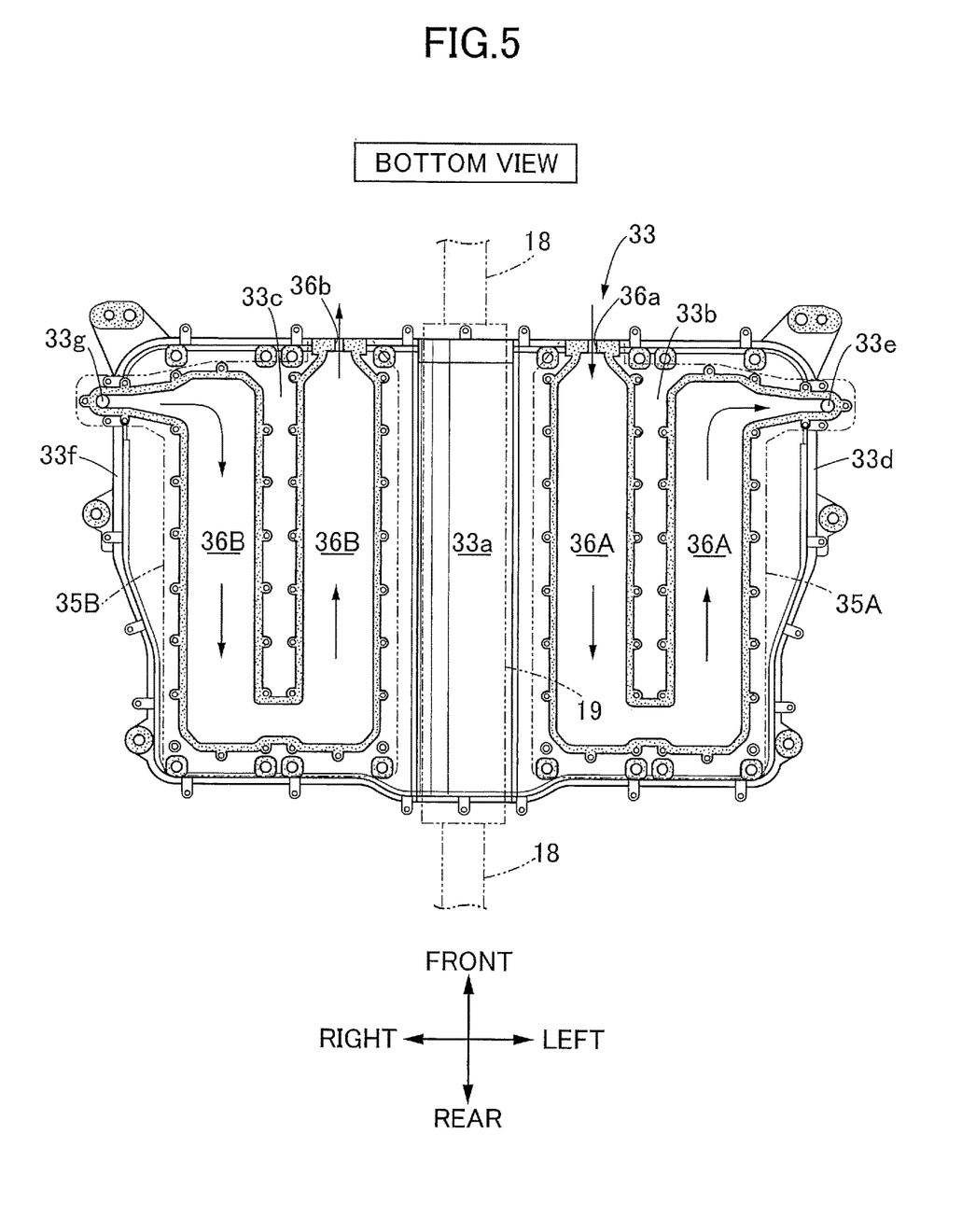
FIG. 5 is a view in the direction of arrow 5 in FIG. 2 (first embodiment).
Figure 6:
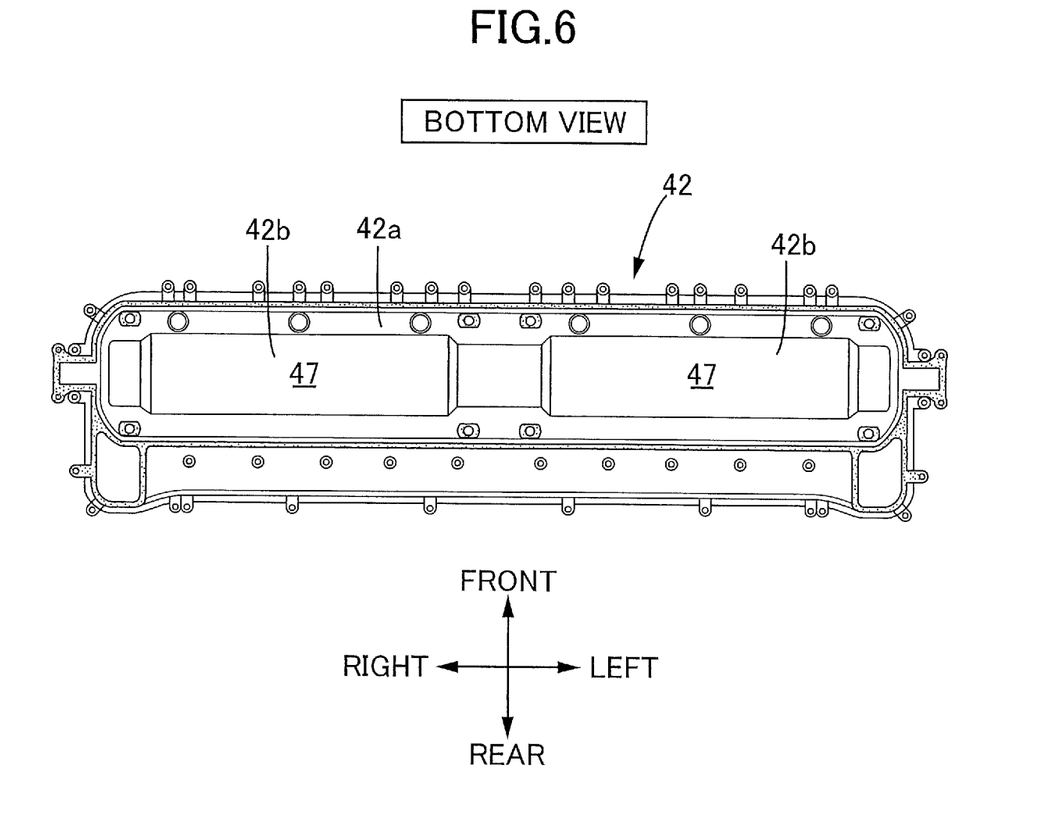
FIG. 6 is a view in the direction of arrow 6 in FIG. 2 (first embodiment).
Figure 7:
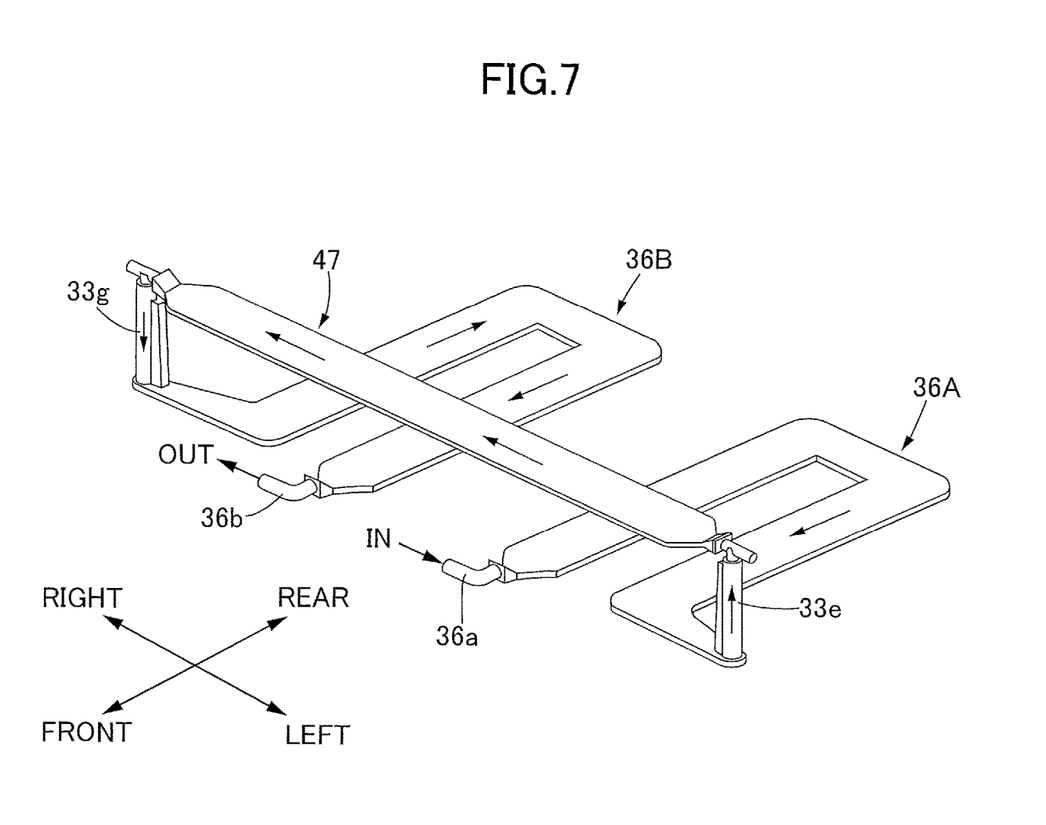
FIG. 7 is a diagram showing the positions of a first water jacket and a second water jacket (first embodiment).

As shown in FIG. 2 and an enlarged box of FIG. 3, outer peripheries of the second water jacket 47 and the left and right communication holes 34b and 34c are sealed by a seal member 48 sandwiched between a lower face of the case lower wall 42a of the second case main body 42 and the upper face of the case upper wall 34a of the first cover 34. An upper face of the case upper wall 34a of the first cover 34, outside the seal member 48, is inclined downward in going outward.

As shown in FIG. 3, a section in the fore-and-aft direction of the second cover 43 includes a case front wall 43a, a case upper wall 43b, and a case rear wall 43c, and the case rear wall 43c is inclined downward to the rear from the upper front. A space having a triangular section is formed between the case rear wall 43c and a rear face of the battery module 45 housed in the second battery case 32, and wiring, etc. 49 is housed in this space. A beam portion 43d having an upward-opening U-shaped section is formed in the vehicle width direction along the rear end of the case rear wall 43c of the second cover 43.

As shown in FIG. 1, the battery pack 17 formed as described above is mounted on the lower face of the floor panel 14 beneath the rear seat 16. A seat cushion 16a of the rear seat 16 is formed so as to be inclined upward to the front, a front part of the seat cushion 16a being disposed above the second battery case 32 of the battery pack 17, and a rear part of the seat cushion 16a being disposed above a rear part of the first battery case 31 of the battery pack 17.

The operation of the embodiment of the present invention having the above arrangement is now explained.

Since the muffler 19 provided in the exhaust pipe 18 extending rearward from the engine 12 mounted on a vehicle body front part is housed in the recess portion 33a extending in the fore-and-aft direction between the left case bottom wall 33b and the right case bottom wall 33c of the first case main body 33 of the first battery case 31 at the lower level, it is possible to dispose the battery pack 17 at as low a position as possible while avoiding interference with the muffler 19, thereby enabling the rear seat 16 disposed above the battery pack 17 to be disposed at a low position and a space to be ensured above the head of an occupant.

Since the four battery modules 37 housed in the first battery case 31 are disposed so that their longitudinal direction coincides with the fore-and-aft direction so as to follow the left and right sides of the recess portion 33a bulging upward from a middle part in the vehicle width direction of the first case main body 33, it is possible to suppress the height of the first cover 34 of the first battery case 31 by lowering the mounting position for the battery module 37. On the other hand, since the two battery modules 37 of the second battery case 32 are disposed in the second case main body 42 so that their longitudinal direction coincides with the vehicle width direction, it is possible to reduce the width in the fore-and-aft direction of the second battery case 32 for it to be thus superimposed only on the front part of the first battery case 31. As a result, the upper face of the battery pack 17 attains a stepped shape that is inclined upward to the front, and disposing the seat cushion 16a of the rear seat 16 so as to follow the upward-to-thefront inclination enables the rear seat 16 to be disposed at a yet lower position, thus ensuring the space above the head of an occupant.

In particular, since the junction board 39 and the battery control device 40 of the battery pack 17 are disposed by utilizing a space above the recess portion 33a in the rear part of the first battery case 31, and the cell voltage sensor 41 is disposed by utilizing a space above the battery module 37 in the rear part of the first battery case 31, the junction board 39 and the battery control device 40, which have relatively large dimensions in the up-down direction, are positioned in the space above the recess portion 33a, where the battery module 37 is absent, and the cell voltage sensor 41, which has a relatively small dimension in the up-down direction, is disposed in the space above the battery module 37, thereby suppressing the height of the upper face of the first battery case 31.

In this way, even if the height of the upper face of the rear part of the first battery case 31 is somewhat increased due to the junction board 39, the battery control device 40, and the cell voltage sensor 41 being housed, since the height of the upper face of the rear part of the first battery case 31 is lower than the height of the upper face of the second battery case 32, there is no possibility that the first battery case 31 will interfere with the seat cushion 16a of the rear seat 16.

Since the case rear wall 43c of the second cover 43 of the second battery case 32 is inclined downward to the rear from the upper front, and the wiring, etc. 49 is disposed in the space defined between the front face of the case rear wall 43c and the rear face of the battery module 45 disposed in the front part of the second battery case 32, it is possible to ensure a space in the interior of the second battery case 32 while avoiding interference of the case rear wall 43c with the seat cushion 16a of the rear seat 16, and to dispose the wiring, etc. 49 by utilizing the space.

Since the first cover 34 of the first battery case 31 includes the beam portion 34f extending in the vehicle width direction, and the second cover 43 of the second battery case 32 includes the beam portion 43d extending in the vehicle width direction, it is possible by means of the beam portions 34f and 43d to reinforce the first battery case 31 and the second battery case 32, thus enhancing the side collision resistance performance.

Cooling water at a low temperature circulates in the path: cooling water supply port 36a→left first water jacket 36A→cooling water supply passage 33e→second water jacket 47→cooling water discharge passage 33g→right first water jacket 36B→cooling water discharge port 36b; the four battery modules 37 are cooled with the left first water jacket 36A and the right first water jacket 36B formed in the bottom part of the first battery case 31, and the two battery modules 45 are cooled with the second water jacket 47 formed in the bottom part of the second battery case 32.

Since the bottom wall of the first case main body 33 of the first battery case 31 is separated into the left case bottom wall 33b and the right case bottom wall 33c by means of the recess portion 33a housing the muffler 19, the water jacket of the first case main body 33 is divided into two, that is, the left first water jacket 36A and the right first water jacket 36B, and the second water jacket 47, which is separate from the left first water jacket 36A and the right first water jacket 36B, is provided on the lower face of the second case main body 42 of the second battery case 32.

In this way, the battery pack 17 includes the left first water jacket 36A, the right first water jacket 36B, and the second water jacket 47, which are separated into three in the up-down and left-right directions; since they are connected in series by the cooling water supply passage 33e provided in the left case side wall 33d of the first case main body 33 and the cooling water discharge passage 33g provided in the right case side wall 33f, it is possible to obtain high cooling performance while shortening the length of the cooling water passage and minimizing the number of components.

Since both the cooling water supply port 36a of the left first water jacket 36A and the cooling water discharge port 36b of the right first water jacket 36B are provided on the front face side of the first battery case 31, it is possible to minimize the length of the cooling water passage connecting the battery pack 17 and the cooling water tank disposed in front of the battery pack 17. Moreover, since the cooling water supply port 36a and the cooling water supply passage 33e are provided at opposite ends in the vehicle width direction of the left first water jacket 36A, the cooling water discharge port 36b and the cooling water discharge passage 33g are provided at opposite ends in the vehicle width direction of the right first water jacket 36B, and the cooling water supply passage 33e and the cooling water discharge passage 33g are provided at opposite ends in the vehicle width direction of the second water jacket 47, it is possible to make the cooling water flow evenly in the internal space of the left first water jacket 36A, the right first water jacket 36B, and the second water jacket 47 while simplifying the routing of the cooling water passage, thus enhancing the cooling performance.

In particular, since the upwardly recessed recess portion 42b is formed in the case lower wall 42a of the second case main body 42 of the second battery case 32, the battery module 45 is placed on the upper face of the recess portion 42b, and the second water jacket 47 is formed between the lower face of the recess portion 42b and the upper face of the case upper wall 34a of the first cover 34 of the first battery case 31 joined thereto, it is possible to form the second water jacket 47 by utilizing as they are the case upper wall 34a of the first battery case 31 and the case lower wall 42a of the second battery case 32, which already exist, without adding a special member. Moreover, since the second water jacket 47 is defined on the exterior of the first battery case 31 and of the second battery case 32, even if cooling water leaks from the second water jacket 47, there is no possibility that cooling water will enter the interior of the first battery case 31 or the second battery case 32.

Since the cooling water supply passage 33e connecting the left first water jacket 36A and the second water jacket 47 is formed in the left case side wall 33d of the first battery case 31, and the cooling water discharge passage 33g connecting the right first water jacket 36B and the second water jacket 47 is formed in the right case side wall 33f of the first battery case 31, not only is it unnecessary to use a special member such as external piping, thus cutting the number of components, but it is also possible to further cut the number of components due to the second water jacket 47, the communication hole 34b, and the communication hole 34c being encircled by the common seal member 48. Moreover, since the case upper wall 34a of the first cover 34 of the first battery case 31 is downwardly inclined in going outward on the outside of the seal member 48 defining the outer periphery of the second water jacket 47 (see FIG. 3), even if cooling water leaks past the seal member 48, the cooling water thus leaking is prevented from building up on the upper face of the case upper wall 34a of the first cover 34.

Furthermore, since the battery cells 44 of the battery module 45 housed in the second battery case 32 are layered in the vehicle width direction, it is possible by making the second battery case 32 long in the vehicle width direction to avoid interference with the seat cushion 16a of the rear seat 16. In this arrangement, since the second water jacket 47 of the second battery case 32 is disposed so that cooling water flows in the vehicle width direction, it is possible to efficiently cool all of the battery cells 44 of the battery module 45.

Second Embodiment

Figure 8:
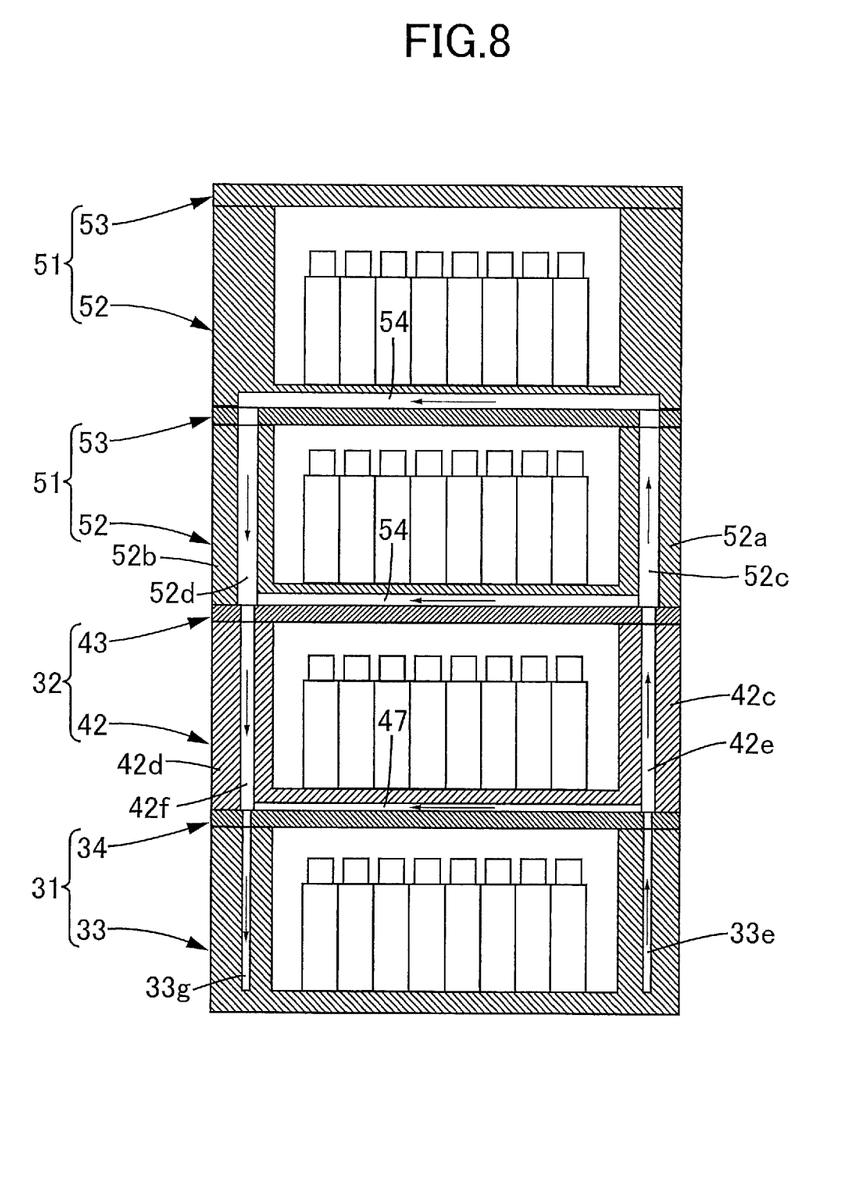
FIG. 8 is a diagram showing the arrangement of first to third water jackets (second embodiment).

A second embodiment of the present invention is now explained by reference to FIG. 8.

The battery pack 17 of the first embodiment includes the first battery case 31 at the lower level and the second battery case 32 at the upper level, but a battery pack 17 of the second embodiment includes one level or a plurality of levels of third battery case 51 that is layered on top of the second battery case 32. The third battery case 51 includes a third case main body 52 on the lower side and a third cover 53 on the upper side, and a third water jacket 54 is formed between the second cover 43 of the second battery case 32 and the third case main body 52 of the third battery case 51 on the upper side of the second battery case 32, or between the third cover 53 of the third battery case 51 at the lower level and the third case main body 52 of the third battery case 51 on the upper side.

A cooling water supply passage 42e and a cooling water discharge passage 42f are formed in a left case side wall 42c and a right case side wall 42d respectively of the second case main body 42 of the second battery case 32, and a cooling water supply passage 52c and a cooling water discharge passage 52d communicating with the cooling water supply passage 42e and the cooling water discharge passage 42f respectively of the second case main body 42 are formed in a left case side wall 52a and a right case side wall 52b of the third case main body 52 of the third battery case 51 above the second battery case 32.

With regard to the cooling water supply passage 33e and the cooling water discharge passage 33g of the first case main body 33, the cooling water supply passage 42e and the cooling water discharge passage 42f of the second case main body 42, and the cooling water supply passage 52c and the cooling water discharge passage 52d of the third case main body 52, the flow path sectional area gradually increases in going from one at the lower level to one at the upper level, and with regard to the left and right first water jackets 36A and 36B of the first battery case 31, the second water jacket 47 of the second battery case 32, and the third water jacket 54 of the third battery case 51, the volume gradually increases in going from one at the lower level to one at the upper level.

In accordance with the second embodiment having the above arrangement, since the third water jacket 54 of the third battery case 51 is connected in parallel with the second water jacket 47 of the second battery case 32, even if three or more levels of battery cases are superimposed, the structure of the cooling water passage does not become complicated, and cooling water can be efficiently supplied to the third water jacket 54 of the third battery case 51.

Moreover, since the more toward the upper level side the battery case, the larger the flow path sectional area of the cooling water supply passage and the cooling water discharge passage, it is possible, by increasing the amount of cooling water supplied to the cooling water jacket on the upper level side, which it is hard for cooling water to reach, to make the cooling effect uniform among the battery case levels. Furthermore, since the higher the level of the battery case, the larger the volume of the cooling water jacket, it is possible, by increasing the amount of cooling water supplied to the cooling water jacket on the upper level side, to which it is hard for cooling water to reach, to make the cooling effect uniform among the battery case levels.

Embodiments of the present invention are explained above, but the present invention may be modified in a variety of ways as long as the modifications do not depart from the gist of the present invention.

For example, the longitudinal member of the present invention is not limited to the muffler 19 of the embodiments, and it may be the exhaust pipe 18 of the embodiments or a propeller shaft transmitting to a rear wheel the driving force of an engine disposed in a front part of a vehicle body.

Furthermore, in the embodiments the cooling water supply port 36a is provided in the left first water jacket 36A, and the cooling water discharge port 36b is provided in the right first water jacket 36B, but the positional relationship between the cooling water supply port 36a and the cooling water discharge port 36b can be exchanged.

Moreover, in the embodiments both the cooling water supply port 36a of the left first water jacket 36A and the cooling water discharge port 36b of the right first water jacket 36B are provided on the front face side of the first battery case 31, but both thereof may be provided on the rear face side of the first battery case 31.

Further, the cooling medium of the present invention is not limited to the cooling water of the embodiments.

What is claimed is:

1. A cooling structure for a battery pack, wherein the battery pack is formed by superimposing a second battery case on an upper side of a first battery case, a first cooling medium jacket through which cooling medium flows being formed on a lower face of the first battery case and a second cooling medium jacket through which cooling medium flows being formed on a lower face of the second battery case,
    wherein a case bottom wall of the first battery case is divided into a left case bottom wall and a right case bottom wall by a recess portion housing a longitudinal member extending in a fore-and-aft direction,
    the first cooling medium jacket comprises a left first cooling medium jacket formed between a lower face of the left case bottom wall and a left lid member joined thereto, and a right first cooling medium jacket formed between a lower face of the right case bottom wall and a right lid member joined thereto,
    the second cooling medium jacket is provided to extend over the longitudinal member in a direction crossing the fore-and-aft direction to positions above the left first cooling medium jacket and the right first cooling jacket, respectively,
    a left end of the left first cooling medium jacket and a left end of the second cooling medium jacket are made to communicate with each other via a left cooling medium passage,
    a right end of the right first cooling medium jacket and a right end of the second cooling medium jacket are made to communicate with each other via a right cooling medium passage, and
    a cooling medium supply port is formed in one of the left and right first cooling medium jackets and a cooling medium discharge port is formed in an other of the left and right first cooling medium jackets.

2. The cooling structure for a battery pack according to claim 1, wherein the cooling medium supply port and the cooling medium discharge port are both provided on a front face side or a rear face side of the first battery case.

3. The cooling structure for a battery pack according to claim 2, wherein
the cooling medium supply port and the cooling medium discharge port are formed at respective inner ends in a vehicle width direction of the left first cooling medium jacket and the right first cooling medium jacket.

4. The cooling structure for a battery pack according to claim 1, wherein
the second cooling medium jacket is formed between a case upper wall of the first battery case and a case lower wall of the second battery case.

5. The cooling structure for a battery pack according to claim 1, wherein
one or a plurality of third battery cases are superimposed on an upper side of the second battery case,
a third cooling medium jacket is formed on a lower face of the third battery case, and
the third cooling medium jacket is connected in parallel with the second cooling medium jacket.

6. The cooling structure for a battery pack according to claim 1, wherein
a battery module housed in the second battery case is formed by layering battery cells in the vehicle width direction, and
the second cooling medium jacket of the second battery case is disposed in the vehicle width direction.

7. The cooling structure for a battery pack according to claim 1, wherein
the cooling structure comprises a single flow path for cooling medium extending from the cooling medium supply port to the cooling medium discharge port while passing through the left and right first cooling medium jackets and the second cooling medium jacket.

8. The cooling structure for a battery pack according to claim 1, wherein
the cooling structure comprises a single flow path for cooling medium extending from the cooling medium supply port to the cooling medium discharge port while passing sequentially through the one of the left and right first cooling medium jacket, the second cooling medium jacket and the other of the left and right first cooling medium jackets.

9. The cooling structure for a battery pack according to claim 1, wherein
the recess portion is provided between the left first cooling medium jacket and the right first cooling medium jacket.

* * * * *